US010146375B2

(12) United States Patent
Shahar et al.

(10) Patent No.: US 10,146,375 B2
(45) Date of Patent: Dec. 4, 2018

(54) FEATURE CHARACTERIZATION FROM INFRARED RADIATION

(71) Applicant: Intel Corporation, Santa Clara, CA (US)

(72) Inventors: Amit Shahar, Sunnyvale, CA (US); Chia-Hsun Lee, Santa Clara, CA (US); Robert L. Davies, Fremont, CA (US); Sterling Orsten, Santa Clara, CA (US)

(73) Assignee: Intel Corporation, Santa Clara, CA (US)

(*) Notice: Subject to any disclaimer, the term of this patent is extended or adjusted under 35 U.S.C. 154(b) by 108 days.

(21) Appl. No.: 15/200,062

(22) Filed: Jul. 1, 2016

(65) Prior Publication Data
US 2018/0004355 A1   Jan. 4, 2018

(51) Int. Cl.
| | | |
|---|---|---|
| *G06F 3/042* | (2006.01) |
| *G06F 3/01* | (2006.01) |
| *G06T 5/30* | (2006.01) |
| *G06T 5/00* | (2006.01) |
| *G06T 7/00* | (2017.01) |
| *G06F 3/00* | (2006.01) |
| *G06F 3/03* | (2006.01) |

(52) U.S. Cl.
CPC ............ *G06F 3/0421* (2013.01); *G06F 3/005* (2013.01); *G06F 3/017* (2013.01); *G06F 3/0304* (2013.01); *G06T 5/003* (2013.01); *G06T 5/30* (2013.01); *G06T 7/0075* (2013.01); *G06F 2203/04101* (2013.01); *G06F 2203/04105* (2013.01); *G06T 2207/10021* (2013.01); *G06T 2207/10048* (2013.01)

(58) Field of Classification Search
CPC ....... G06F 3/0421; G06F 3/017; G06T 5/003; G06T 5/30
See application file for complete search history.

(56) References Cited

U.S. PATENT DOCUMENTS

| | | |
|---|---|---|
| 6,810,135 B1 | 10/2004 | Berenz et al. |
| 9,224,060 B1 * | 12/2015 | Ramaswamy ..... G06K 9/00912 |
| 2006/0104488 A1 | 5/2006 | Bazakos et al. |
| 2007/0106160 A1 | 5/2007 | Kilgore et al. |
| 2008/0107309 A1 | 5/2008 | Cerni |

(Continued)

OTHER PUBLICATIONS

International Search Report and Written Opinion for International Patent Application No. PCT/US2017/035470, dated Jul. 31, 2017, 14 pages.

*Primary Examiner* — Bobbak Safaipour
(74) *Attorney, Agent, or Firm* — Jordan IP Law, LLC

(57) ABSTRACT

Systems, apparatuses, and/or methods to characterize a user feature. For example, and apparatus may include a pattern receiver to receive a feature infrared (IR) pattern corresponding to non-uniform IR radiation reflected by skin of the user feature and an object IR pattern corresponding to IR radiation reflected by an object. The apparatus may further include a filter to generate a modified IR pattern from the object IR pattern and to remove at least a part of the modified IR pattern from feature IR pattern. In addition, the apparatus may include a feature characterizer to characterize the user feature based on the feature IR pattern. In one example, a computing platform may be controlled based on the characterization of the user feature.

20 Claims, 4 Drawing Sheets

(56) References Cited

U.S. PATENT DOCUMENTS

| | | | | |
|---|---|---|---|---|
| 2011/0235871 A1* | 9/2011 | Byren | ............... | G06K 9/00033 |
| | | | | 382/124 |
| 2013/0069911 A1* | 3/2013 | You | .................... | G06F 3/0416 |
| | | | | 345/175 |
| 2015/0011892 A1* | 1/2015 | Sostek | ............... | A61B 5/0064 |
| | | | | 600/473 |
| 2015/0256813 A1* | 9/2015 | Dal Mutto | ........... | H04N 13/254 |
| | | | | 348/47 |
| 2016/0117563 A1* | 4/2016 | Shin | .................. | G06K 9/00885 |
| | | | | 382/115 |
| 2016/0155006 A1* | 6/2016 | Makkapati | ........... | G06K 9/2036 |
| | | | | 382/128 |
| 2017/0032531 A1* | 2/2017 | Nagata | ............... | G01B 11/2513 |
| 2017/0243449 A1* | 8/2017 | Barboni | .................. | G08B 5/36 |
| 2017/0332021 A1* | 11/2017 | Cui | .................... | G02B 6/0068 |
| 2017/0336918 A1* | 11/2017 | Holman | ............... | G06F 3/0418 |

* cited by examiner

FEATURE CHARACTERIZATION FROM INFRARED RADIATION

TECHNICAL FIELD

Embodiments generally relate to characterizing a feature from infrared radiation. More particularly, embodiments relate to processing reflected infrared radiation to detect a user feature, track a user feature, detect a touch event involving a user feature, detect a finger press event involving a user feature, and/or control a device.

BACKGROUND

Traditional systems to detect and/or track a user feature may utilize image-processing techniques that maximize detail for the user feature. For example, a red-blue-green (RGB) color spectrum or relatively high resolution may be used to detect and/or track the user feature. In addition, a depth camera may be used to measure a set of points on the user feature and output the set of points in a data file as a point cloud to detect and/or track the user feature in three-dimensional (3D) space. In this regard, stereo matching performed prior to generating the point cloud may require processing of entire stereo images. Moreover, z-distance for the user feature in a 3D coordinate system and/or touching by the user feature may be determined using capacitive sensing devices (e.g., touch screen, etc.) or mechanical sensing devices (e.g., keyboard, etc.). The traditional systems, therefore, may require extra hardware such as a touch-sensitive panel, waste computing resources, delay detection, delay tracking, require various peripheral devices, lack pressure detection, and so on. Thus, there is considerable room for improvement to detect a user feature, track a user feature, detect a touch event, detect a finger press event, and/or control a device using a user feature.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Figure 1:
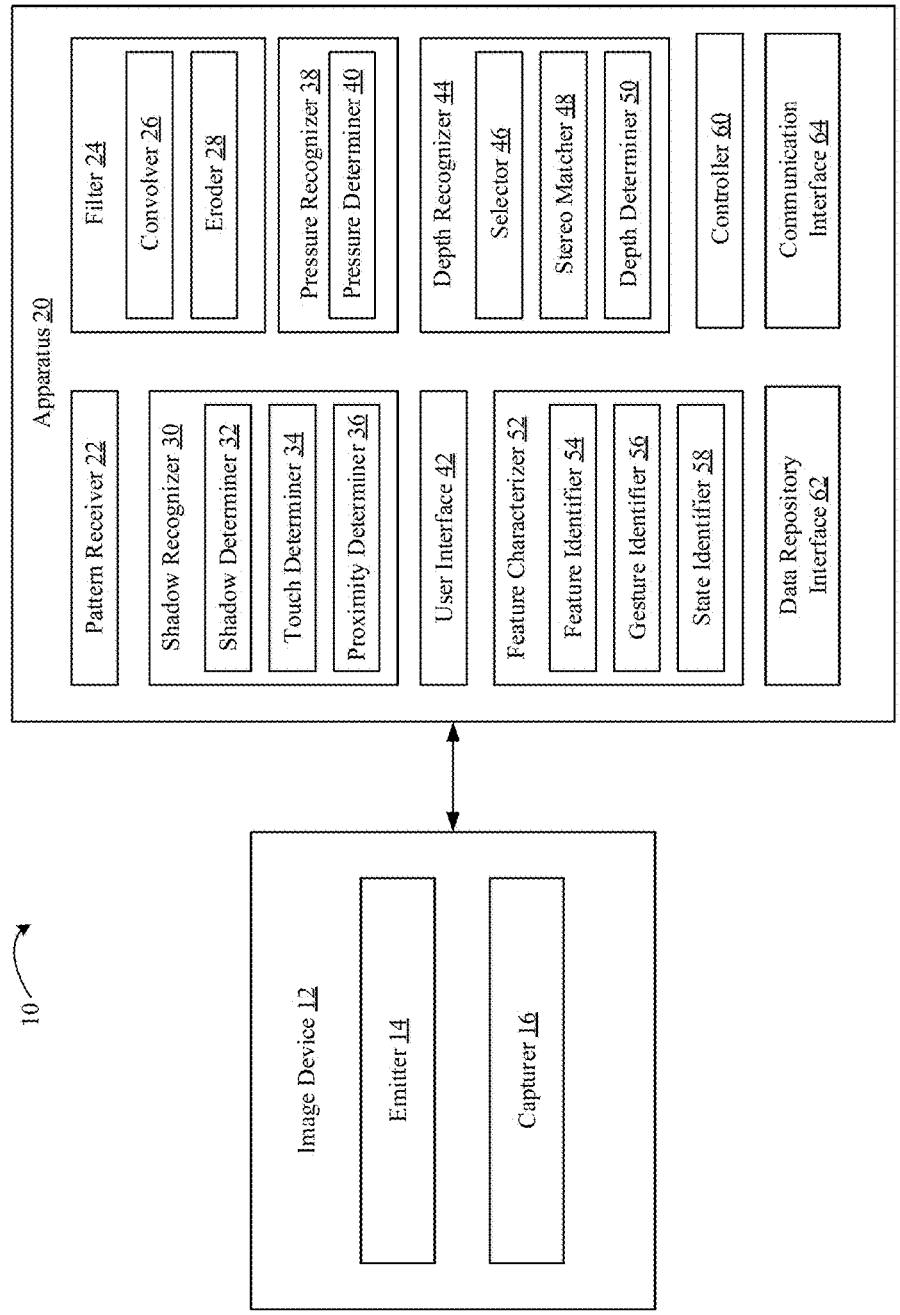
FIG. 1 is an illustration of an example of a system to characterize a user feature from infrared (IR) radiation according to an embodiment.

Turning now to FIG. 1, a system 10 is shown to characterize a user feature from infrared (IR) radiation according to an embodiment. The system 10 includes an image device 12 having an emitter 14 to emit electromagnetic radiation and a capturer 16 to capture reflected radiation. The emitter 14 may emit electromagnetic radiation in one or more spectrums, such as the IR spectrum, the visible light spectrum, and so on. In addition, the emitter 14 may be located anywhere between two image sensors of the capturer 16, which may capture stereo images of a scene at different points of view. In one example, the image device 12 includes a three-dimensional (3D) camera such as an Intel® RealSense™ camera (Intel and RealSense are trademarks of Intel Corporation).

A scene captured by the image sensors of the capturer 16 may include a user feature and/or an object that reflect light from the emitter 14. For example, the user feature may include any feature in the scene having skin such as a finger, a hand, an appendage, a face, and so on. Moreover, the object may include any object other than the user feature in the scene such as an inanimate object having a surface defining a plane relative to the user feature (e.g., a table, a screen, a wall, etc.). In one example, the image sensors may be fed with a predetermined voltage (e.g., 5V) of electrical power to generate sensor signals based on waveform amplitude of the reflected light from the feature and/or the object. The generated sensor signals from the image sensors may be electrically transferred as analog sensor signals through a pull down resistor and converted to digital representation via an analog-to-digital converter.

Uniform IR light from the emitter 14 may, for example, traverse a lens of the image device 12 and be converted to non-uniform IR light having an IR pattern (e.g., a spatial IR pattern, a dotted IR pattern, etc.). Moreover, non-uniform IR light reflected by skin may provide an IR pattern (e.g., feature IR pattern) that has different optical properties relative to an IR pattern provided by non-uniform IR light reflected by the object (e.g., object IR pattern). In this regard, reflected non-uniform IR radiation may include an IR pattern having optical properties based on a sub-surface scattering effect caused from a composition of human skin. The diffusion of non-uniform IR light by skin may, for example, modify waveform amplitude of non-uniform IR light to form a softer and/or blurry IR pattern relative to a stronger and/or sharper IR pattern formed by diffusion of non-uniform IR light by an object.

Accordingly, the digital representation may include an IR image having IR patterns corresponding to the user feature and the objects in the scene, wherein the IR patterns may include grayscale pixel values between a minimum value (e.g., 8-bit value, black pixel=0) and a maximum value (e.g., 8-bit value, white pixel=255). In one example, the feature IR pattern may include grayscale pixel values that are relatively closer to a middle value (e.g., 8-bit value, middle gray pixel=128) and the object IR pattern may include grayscale pixel values that are relatively closer to the minimum value or the maximum value. Thus, the feature IR pattern may appear relatively softer and/or blurry while the object IR pattern may appear relatively stronger and/or sharper.

The system 10 further includes an apparatus 20 that may have logic (e.g., logic instructions, configurable logic, fixed-functionality logic hardware, etc.) configured to implement any of the herein mentioned processes including, for example, detecting a user feature, tracking a user feature, detecting a touch event involving a user feature, detecting pressure involving a user feature, controlling a device using a user feature, and so on. In the illustrated example, the apparatus 20 includes a pattern receiver 22 to receive the feature IR pattern corresponding to IR radiation reflected by skin and the object IR pattern corresponding to IR radiation reflected by the object (if any). For example, the pattern receiver 22 may obtain an IR image including the IR feature pattern and the object pattern from the image device 12, a data repository, and so on.

The apparatus 20 further includes a filter 24 to generate a modified IR pattern from the object IR pattern. For example, the filter 24 includes a convolver 26 to generate a sharpened IR pattern by modification of a pixel value in the object IR pattern to a minimum value or a maximum value. The convolver 26 may, for example, apply a convolution kernel to an entire IR image including to the feature IR pattern and the object IR pattern, having a pre-defined spatial rule such as an n×m sharpening kernel (e.g., a 3×3 sharpening kernel, where A=$a_{1,1}$, $a_{1,2}$, $a_{1,3}$, $a_{2,1}$, $a_{2,2}$, $a_{2,3}$, $a_{3,1}$, $a_{3,2}$ $a_{3,3}$, where $a_{1,1}$, $a_{1,3}$, $a_{3,1}$, $a_{3,3}$=0, $a_{1,2}$, $a_{2,1}$, $a_{2,3}$, $a_{3,2}$=−2, and $a_{2,2}$=10).

The result of the sharpening kernel may sharpen pixels corresponding to an environment other than skin in the scene by converting at least a part of gray pixels (e.g., a majority of gray pixels, substantially all gray pixels, etc.) in the object IR pattern to black pixels (e.g., 0) or white pixels (e.g., 255). In this regard, the convolution kernel may not sharpen a grayscale pixel value of the feature IR pattern to a maximum value or a minimum value since it is relatively closer to the middle value and may sharpen a grayscale pixel value of the object IR pattern since it is relatively closer to a maximum value or a minimum value. Thus, optical characteristics of the feature IR pattern may remain substantially unchanged. For example, the feature IR pattern may be sharper after the sharpening kernel is applied but remain relatively soft and/or blurry.

The filter 24 may also remove at least a part of the modified IR pattern from the feature IR pattern. For example, the filter 24 includes an eroder 28 to generate an erosion IR pattern from a sharpened IR pattern by removal of at least a part of the sharpened IR pattern. The eroder 28 may, for example, apply an erosion kernel having a pre-defined spatial rule (e.g., 3×3 kernel) to an entire IR image including to the feature IR pattern and the modified IR pattern to substantially remove at least a part of the sharpened IR pattern based a neighborhood of pixel values including the minimum values and the maximum values.

For example, the erosion kernel may be implemented to delete a pixel in the sharpened IR pattern (e.g., convert a white pixel to a black pixel) that neighbors a cluster of different pixels (e.g., a white pixel at $a_{2,2}$ surrounded by black pixels). In this regard, the erosion kernel may not delete a grayscale pixel value of the feature IR pattern since it is not a maximum value or a minimum value and may delete a sharpened pixel value of the sharpened IR pattern since it is a maximum value or a minimum value. Thus, erosion may result in a recognizable user feature from the remaining feature IR pattern (e.g., feature extraction).

The eroder 28 may implement a plurality of iterations of erosion until a predetermined resolution threshold is met for the user feature (e.g., until feature contour appears, etc.). The number of iterations may be determined from factors such as a distance of the user feature to the image device 12, image device parameters such as IR gain and auto-exposure, and so on. In one example, three iterations of erosion may make the feature IR pattern visible enough to recognize user hands, track user hands, etc. Notably, making the feature IR pattern visible using the filter 24 may be faster and/or more efficient relative to image processing techniques utilizing red-blue-green (RGB) values or high resolution to identify the user feature, track the user feature, and so on.

The apparatus 20 further includes a shadow recognizer 30 to recognize a shadow associated with the user feature. For example, the shadow recognizer 30 includes a shadow determiner 32 to determine a shadow concentration between the feature IR pattern and the object IR pattern. In one example, black pixels may correspond to a shadow cast by the user feature on the object located underneath the user feature. The shadow determiner 32 may, for example, identify a cluster of black pixels between the feature IR pattern and the object IR pattern and calculate a number of black pixels to determine the shadow concentration. In this regard, the shadow recognizer 30 may use one IR image and/or a plurality of IR images to determine the shadow concentration.

The shadow recognizer 30 further includes a touch determiner 34 to determine a touch event involving the user feature based on the shadow concentration. For example, the shadow concentration may decrease when the user feature moves towards the object and away from the emitter 14. Thus, the touch determiner 34 may determine that the user feature is in contact with the object when the shadow concentration is below a predetermined threshold. In one example, no black pixels in an area adjacent to the user feature in an IR image where a shadow is expected indicates that the user feature is touching the object (e.g., no black pixels=contact).

The shadow recognizer 30 further includes a proximity determiner 36 to determine proximity between the user feature and the object based on the shadow concentration. The shadow concentration may, for example, increase when the user feature moves away from the object and towards the emitter 14. Thus, the proximity determiner 36 may determine that a specific number of black pixels from the shadow concentration indicate a specific distance of the user feature to the object. In one example, the proximity determiner 36 may use a real-time calculation based on feature dimensions (e.g., hand size, etc.) and/or shadow concentration (e.g., number of black pixels) to calculate proximity. For example, a number of black pixels in an area adjacent to the user feature in an IR image where a shadow is expected may indicate that the user feature is a particular distance away from the object (e.g., 50 black pixels=1 cm away).

Additionally, the proximity determiner 36 may utilize a reference proximity value corresponding to shadow concentration. The reference proximity value may include a calibration proximity value from a calibration process by the user, a general proximity value from a database for similar types of features, and so on. For example, a number of black pixels in an area adjacent to the user feature in an IR image where a shadow is expected may be evaluated against a calibration value for that specific feature and/or against a general proximity value for that specific type of feature. The evaluation may indicate that the user feature is a particular distance away from the object.

The apparatus 20 further includes a pressure recognizer 38 to recognize a pressure associated with the user feature. For example, the pressure recognizer 38 includes a pressure determiner 40 to determine pressure corresponding to a press event involving the user feature. In one example, the pressure determiner 40 may use a real-time calculation to average pixels in a pixel area of an IR image, such as a portion of the user feature (e.g., a fingertip, etc.), to determine a pressure value. The pressure determiner 40 may evaluate the pressure value against a reference pressure value including a calibration pressure value from a calibration process by the user, a general pressure value from a database for similar types of features, and so on.

The pressure determiner 40 may, for example, determine that an IR pressure value is different than a reference IR pressure value (e.g., a resting IR pressure value). In this regard, detection of any change from the reference pressure value may be all that is needed to determine a press event. Similarly, the pressure determiner 40 may utilize a red-blue-green (RGB) pressure value to detect a change from a reference RGB pressure value to determine a press event. The pressure determiner 40 may also determine a press event from grayscale pixel values and/or RGB values independent of detecting whether a change has occurred. For example, RGB values corresponding to white color around a fingertip and/or relatively lighter grayscale IR pixel values in a pixel area for the fingertip may indicate blood has moved away from the fingertip in a press event. In this regard, pressure values and/or reference pressure values may also be used to determine a magnitude of pressure (e.g., how hard a user is pressing with the user feature).

The apparatus 20 further includes a user interface 42 to provide a visual representation of data associated with the user feature. For example, the user interface may be rendered via a display screen or projected (e.g., in air, onto a surface, etc.) to render IR images, RGB images, etc. In one example, a pressure bar may be rendered to visualize pressure and/or to create a visual feedback mechanism. For example, the pressure bar may indicate how hard a user is pressing (e.g., pressure magnitude) and allow the user to modify pressure to control operation of a computing platform. The pressure bar may include, for example, a color indicator that varies (e.g., linearly across the visible light spectrum to change bar color, etc.) with respect to pressure applied.

The apparatus 20 further includes a depth recognizer 44 to recognize a depth of the user feature in 3D space. For example, the depth recognizer 44 includes a selector 46 to select a portion of pixels from the feature IR pattern in a first stereo IR image and/or a portion of pixels from a different feature IR pattern corresponding to IR radiation reflected by skin of the same feature in a second stereo IR image. The selector 46 may, for example, select a pixel area defined by row and column widths (e.g., using a bounding box) in the first stereo IR image and/or in the second stereo IR image for the same user feature. Notably, the pixel area may only include a portion of the user feature, with or without pixels for a portion corresponding to a shadow cast by the user feature.

The depth recognizer 44 further includes a stereo matcher 48 to make a comparison between the portion of pixels from 48 and the portion of pixels from the different feature IR pattern. For example, the selector 46 may select a pixel area including a fingertip of a hand in both a left stereo IR image and a right stereo IR image, wherein the stereo matcher 48 may determine pixel alignment mismatches between the pixel areas to determine depth. The output of the stereo matcher 48 may include, for example, an offset value indicating a number of pixels that the pixel areas offset in distance. The stereo matcher 48 may also provide a plurality of offset values for a plurality of portions of the user feature, an offset value for an entire user feature, etc.

The depth recognizer 44 further includes a depth determiner 50 to determine a depth of the user feature based on the comparison by the stereo matcher 48. For example, the depth determiner 50 may use a real-time calculation based on an offset value to calculate depth of the user feature in 3D space. In one example, the offset value indicates that the user feature is a particular distance away from the image device 12 (e.g., 5 pixel alignment mismatch or pixel offset=30 cm away from camera). The depth determiner 50 may also utilize a reference offset value corresponding to z-dimensional distance (e.g., z-proximity) including a calibration offset value from a calibration process by the user, a general calibration offset value from a database for similar types of features, and so on.

Notably, determination of a touch event, proximity, pressure, and/or depth may be accomplished sequentially and/or in parallel using the same or different pixel area, from one or more IR images. For example, the touch determiner 34 may determine a touch event and/or the proximity determiner 36 may determine proximity based on shadow concentration from a portion corresponding to a shadow cast by a fingertip on a surface using a pixel area from one or more stereo IR images selected by the selector 46. Similarly, the pressure determiner 40 may determine pressure from the same or different pixel area from one or more stereo IR images selected by the selector 46. Each component, however, may use a unique pixel area (e.g., pixel portions) for sequential and/or parallel processing with one or more other pixel areas, from one or more IR images, one or more IR patterns, and so on.

Moreover, the apparatus 20 may operate relatively more efficiently (e.g., quicker matching, depth determination, proximity determination, pressure determination, etc.) and/or may not waste resources (e.g., less power, etc.) since only portions of one or more IR images may be utilized. Additionally, any or all of the processes described herein may utilize a plurality of feature IR pattern portions for a user feature or an entire feature IR pattern for a user feature and maintain improved efficiency and resource conservation relative to techniques that utilize entire images. In addition, optical techniques described herein may provide touch, proximity, and/or pressure data individually and/or in combination with high quality 3D z-proximity spatial data without the need for various peripheral devices such as touch screens, keyboards, etc.

The apparatus 20 further includes a feature characterizer 52 to characterize the user feature. In one example, characterization of the user feature may include an identification of the user feature based on the feature IR pattern. Thus, the feature characterizer 52 includes a feature identifier 54 to identify the user feature. The feature identifier 54 may, for example, identify skin of the user feature based on the feature IR pattern. The feature identifier 54 may, for example, evaluate the feature IR pattern to detect a landmark for feature identification (e.g., detect a finger tip of a finger, detect five fingers of a hand, detect a nose of a face, etc.). In addition, the feature identifier 54 may utilize a reference feature IR pattern including a calibration feature IR pattern from a calibration process by a user, a general feature IR pattern from a database of general feature IR patterns for types of features, and so on.

Characterization of the user feature may also include a gesture involving the user feature. Thus, the feature characterizer 52 includes a gesture identifier 56 to determine whether the user has made a gesture based on the feature IR pattern. For example, the user may make a hand gesture including a "Thumbs up" hand position, and the gesture identifier 56 may determine that the feature IR pattern corresponds a gesture including the "Thumbs up" position based on a landmark, a reference gesture pattern, and so on. Other finger and/or hand positions may be detected and/or tracked (e.g. over time, etc.) such as "Index expanded; others at rest" position, "Index and middle fingers expanded; others contracted" position, "Index, middle, and ring fingers expanded; others contracted" position, and "Index, middle, ring, and baby fingers expanded; thumb contracted" position; "All fingers contracted (fist)" position, "Love and peace" position, "Hand at rest (no contraction or expansion)" position, and so on. Further gestures may include, for example, a head nod gesture, an arm waive gesture, and so on.

Characterization of the user feature may also include a state involving the user feature. Thus, the feature characterizer 52 includes a state identifier 58 to identify a state involving the user feature based on the feature IR pattern. For example, the user feature may currently be in contact with the object (e.g., a surface) and the state identifier 58 may identify the contact state. In addition, the user feature may be in a motion with respect to the image device 12, the object, the user, and so on. Other states may include, for example, a motionless state, a pressing state, a resting state, a gesture state, a typing state, an approaching state, and so on. Thus, the feature characterizer 54 may utilize data from any or all components of the apparatus 20 to characterize the user feature.

The apparatus 20 further includes a controller 60 to generate control function data for a function of a computing platform based on the characterization of the user feature. The computing platform may include, for example, a laptop, personal digital assistant (PDA), media content player, mobile Internet device (MID), any smart device such as a wireless smart phone, smart tablet, smart TV, smart watch, computer server, gaming platform, and so on. In one example, the computing platform may be separate from the image device 12 and/or the apparatus 20. In another example, the computing platform may be integral with the image device 12 and/or the apparatus 20.

The controller 60 may, for example, generate control function data to control operation of a drone (e.g., a vehicle, etc.), a surgical instrument, a smart device, and so on. In one example, the control data may control selection of characters from a keyboard associated with a smart device that may be projected onto a surface, that may be disposed in air over the surface in a real environment, in an augmented reality environment, and so on. In a further example, the control data may control features of a game to add responsiveness when a user feature is moving in 3D space rather than responsiveness only when the user feature is in contact with a surface. For example, movement towards a surface may be correlated to movement in a game to enhance user experience.

The apparatus 20 may further includes a data repository interface 62 that may interface with memory (e.g., cache, random access memory, etc.), with a hard drive (e.g., on-platform storage, removable storage, etc.), and so on. The apparatus 20 may also include a communication interface 64 that may interface with communication functionality for a wide variety of purposes such as, for example, cellular telephone (e.g., Wideband Code Division Multiple Access/W-CDMA (Universal Mobile Telecommunications System/UMTS), CDMA2000 (IS-856/IS-2000), etc.), WiFi (Wireless Fidelity, e.g., Institute of Electrical and Electronics Engineers/IEEE 802.11-2007, Wireless Local Area Network/LAN Medium Access Control (MAC) and Physical Layer (PHY) Specifications), LiFi (Light Fidelity, e.g., Institute of Electrical and Electronics Engineers/IEEE 802.15-7, Wireless Local Area Network/LAN Medium Access Control (MAC) and Physical Layer (PHY) Specifications), 4G LTE (Fourth Generation Long Term Evolution), Bluetooth (e.g., Institute of Electrical and Electronics Engineers/IEEE 802.15.1-2005, Wireless Personal Area Networks), WiMax (e.g., IEEE 802.16-2004, LAN/MAN Broadband Wireless LANS), Global Positioning System (GPS), spread spectrum (e.g., 900 MHz), NFC (Near Field Communication, ECMA-340, ISO/IEC 18092), and other radio frequency (RF) purposes. Thus, the apparatus 20 may utilize the data repository interface 62 and/or the communication interface 64 to provide access to data to/from one or more components of the system 10.

While examples have provided various components of the system 10 for illustration purposes, it should be understood that one or more components of the image device 12 and/or the apparatus 20 may reside in the same and/or different physical and/or virtual locations, may be combined, omitted, bypassed, re-arranged, and/or be utilized in any order. In one example, one or more components of the image device 12 may physically reside on the same computing platform as one or more components of the apparatus 20. In another example, one or more components of the image device 12 and/or the apparatus 20 may be distributed among various computing platforms to provide distributed user feature characterization. Moreover, any or all components of the image device 12 and/or the apparatus 20 may be automatically implemented (e.g., without human intervention, etc.). For example, the filter 24 may automatically generate a modified IR pattern.

Figures 2A, 2B:
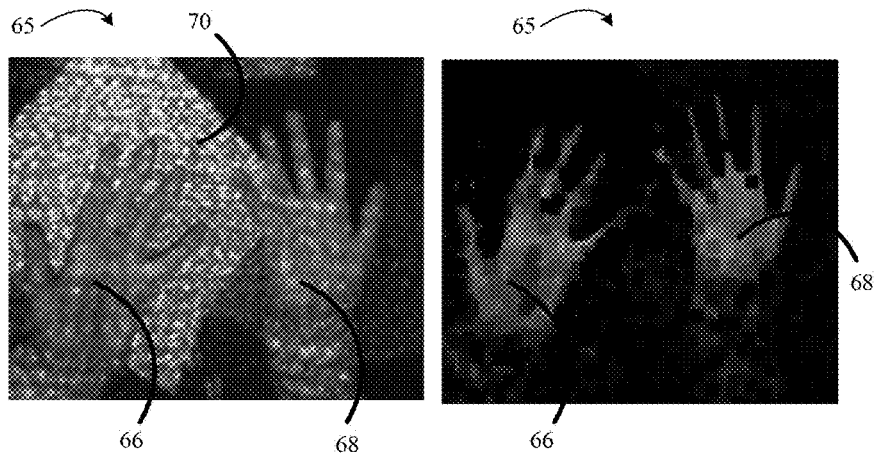
FIGS. 2A-2B are illustrations of example IR patterns in a single IR image that is filtered to detect and/or track a user feature according to an embodiment.

FIGS. 2A-2B show example patterns in a single image that is filtered to detect and/or track user features according to an embodiment. As shown in FIG. 2A, a single IR image 65 includes a feature IR pattern 66 corresponding non-uniform IR radiation reflected back from a left hand in a palm-up state and a feature IR pattern 68 corresponding to non-uniform IR radiation reflected back from a right hand in a palm-up state. The IR image 65 further includes an object IR pattern 70 corresponding to non-uniform IR radiation reflected back from an object, such as a surface of a real object in the scene. As further shown in FIG. 2A, diffusion of non-uniform IR light by skin of the right hand and the left hand modifies waveform amplitude of IR light to form the IR patterns 66, 68, which are softer and/or blurrier relative to the object IR pattern 70 formed by diffusion of non-uniform IR light by the object.

As shown in FIG. 1B, the IR image 65 may be processed to extract user features (e.g., the left hand and the right hand). In particular, the IR image 65 may be filtered to generate a modified IR pattern from the object IR pattern 70. In one example, a convolution kernel (e.g., sharpening kernel) may be applied to the entire IR image 65 to sharpen pixels corresponding to the background of the IR image 65. In this regard, grayscale pixels in the object IR pattern 70 may be sharpened (e.g., converted) to black pixels (e.g., 8-bit value=0) or white pixels (e.g., 8-bit value=255). In addition, the modified IR pattern including the sharpened pixels may be removed from the IR image 65. For example, an erosion kernel may be applied to the IR image 65 to delete a pixel in the sharpened IR pattern (e.g., convert a white pixel to a black pixel) that neighbors a cluster of different pixels (e.g., a white pixel surrounded by black pixels). Erosion may iteratively be implemented until a predetermined resolution is achieved (e.g., contour of the hands appears, etc.).

Figures 3A, 3B:
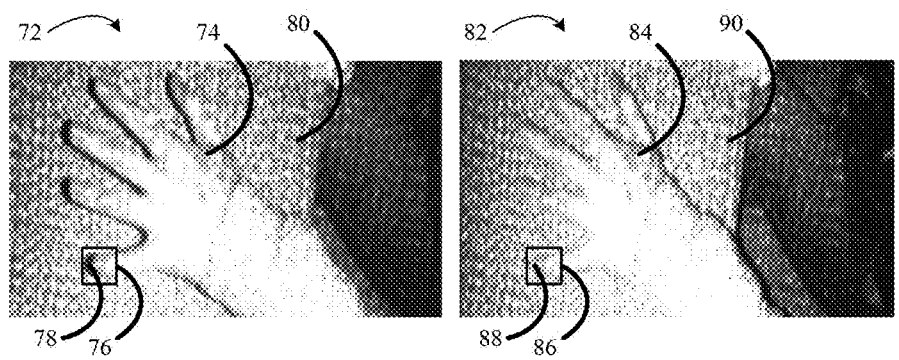
FIGS. 3A-3B are illustrations of example IR patterns in stereo IR images to determine proximity of a user feature and/or depth of a user feature according to an embodiment.

Turning now to FIGS. 3A-3B, example patterns in a plurality of IR images are shown to determine a touch event, proximity, and/or depth. As shown in FIG. 3A, a first stereo IR image 72 includes a feature IR pattern 74 corresponding non-uniform IR radiation reflected by a right hand in a palm-down state. In addition, a pixel area 76 defined by row and column pixel widths may be selected to include a portion of pixels from the feature IR pattern 74 (e.g., a fingertip), a portion of pixels corresponding to a shadow concentration 78 for a shadow cast by the user feature (e.g., by the fingertip), and a portion of pixels from an object IR pattern 80 for an object (e.g., a surface of a table).

The first stereo IR image 72 may be utilized alone to determine proximity between the right hand and the object based on the shadow concentration 78. For example, a particular number (e.g., concentration) of black pixels in a region adjacent to the feature IR pattern 74 and the object IR pattern 80 in the pixel area 76 where the shadow is expected may indicate that the user feature is a particular distance away from the object (e.g., z-distance in a Cartesian coordinate system). Factors to reliably determine proximity may include, for example, dimensions of a feature, location of an emitter with respect to an image sensor, reference proximity values, and so on.

As shown in FIG. 3B, a second stereo IR image 82 corresponds to non-uniform IR radiation reflected by the right hand in the palm-down state captured at a different viewpoint than the viewpoint of the first stereo IR image 72. In addition, a pixel area 86 defined by row and column pixel widths may be selected to include a portion of pixels from the feature IR pattern 84 (e.g., the fingertip), a portion of pixels corresponding to a shadow concentration 88 for a shadow cast by the user (e.g., by the fingertip), and a portion of pixels from an object IR pattern 90 for the object underneath the user feature. Thus, the second stereo IR image 82 may be implemented to determine proximity alone in a similar manner as the first stereo IR image 72, discussed above.

Proximity may be validated and/or enhanced by evaluation of the shadow concentrations 78, 88 for the same feature in the stereo IR images 72, 82. For example, shadow concentrations 78, 88 observed in the pixel areas 76, 78 for the right hand of a particular size and/or for an emitter location relative to stereo image sensors may validate and/or enhance reliability of proximity determinations. In one example, the shadow concentrations 78, 88 in the pixel areas 76, 78 may be within a predetermined threshold value (e.g., black pixels=0) which when taken together may validate and/or enhance reliability of a proximity determination (e.g., in contact, touching, no distance, etc.).

Depth of the user feature may be determined by stereo matching between the IR images 72, 82, such as by stereo matching between portions of the feature IR images 74, 84. In one example, portions being matched may include the entire feature IR patterns 74, 84, a plurality of portions of the feature IR patterns 74, 84 (e.g., index finger vs. index finger, ring finger vs. ring finger, etc.), and/or one portion of the feature IR patterns 74, 84. In the illustrated example, alignment mismatches between pixels for the fingertip in the pixel area 76 of the first stereo IR image 72 and the fingertip in the pixel area 86 of the second stereo IR image 82 may be stereo matched to determine depth for the thumb, for the right hand, and so on. Thus, an offset value indicating a number of pixels that the feature IR patterns 74, 84, the pixel areas 76, 86, and/or the fingertips offset in distance indicate the user feature is a particular distance away from an image device (e.g., z-distance in a Cartesian coordinate system).

Figure 4:
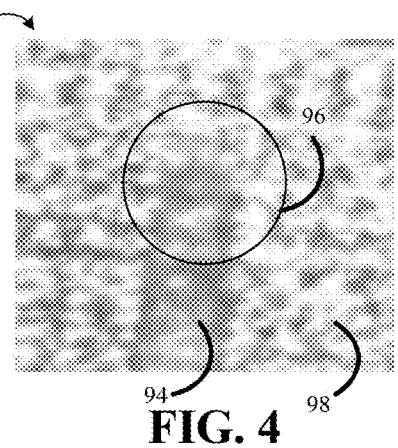
FIG. 4 is an illustration of an example IR pattern to determine proximity, a touch event, and/or pressure involving a user feature according to an embodiment.

FIG. 4 shows an example pattern to determine proximity, a touch event, and/or a press event for a user feature according to an embodiment. As shown in FIG. 4, an IR image 92 includes a feature IR pattern 94 corresponding non-uniform IR radiation reflected by a finger in a touch state and/or press state. In addition, a pixel area 96 defined by row and column pixel widths may be selected to include a portion of pixels from the feature IR pattern 94 (e.g., a fingertip) and a portion of pixels from an object IR pattern 98.

The IR image 92 may be utilized to determine proximity between the finger and an object based on shadow concentration. For example, a particular number of black pixels in an area adjacent to the feature IR pattern 94 and the object IR pattern 98 in the pixel area 96 where a shadow is expected may indicate that the user feature is a particular distance away from the object (e.g., z-distance in a Cartesian coordinate system). In the illustrated example, absence of black pixels where a shadow is expected between the feature IR pattern 94 and the object IR pattern 98 indicates that proximity is 100% between the finger and the object (e.g., in contact, touching, no distance, etc.). Independent of proximity, absence of a shadow may directly indicate a touch event.

The IR image 92 may also be utilized to determine pressure associated with the finger. For example, pixels in the pixel area 96 corresponding to the finger may be averaged to determine an IR pressure value which when compared to a reference IR pressure value (e.g., a resting IR pressure value) may indicate a detectable change that itself represents a press event. In addition, pixel values in the pixel area 96 corresponding to the finger may be used to detect a press event independent of detecting whether a change has occurred from a resting pressure value. For example, relatively lighter grayscale IR pixel values in the pixel area 96 for the finger may indicate blood has moved away from the finger in a press event. In addition, RGB pressure values may be used, alone or in combination with IR pressure values, to determine pressure and/or a press event. Moreover, pressure values and/or reference pressure values may be used to determine a magnitude of pressure in the press event.

Figure 5:
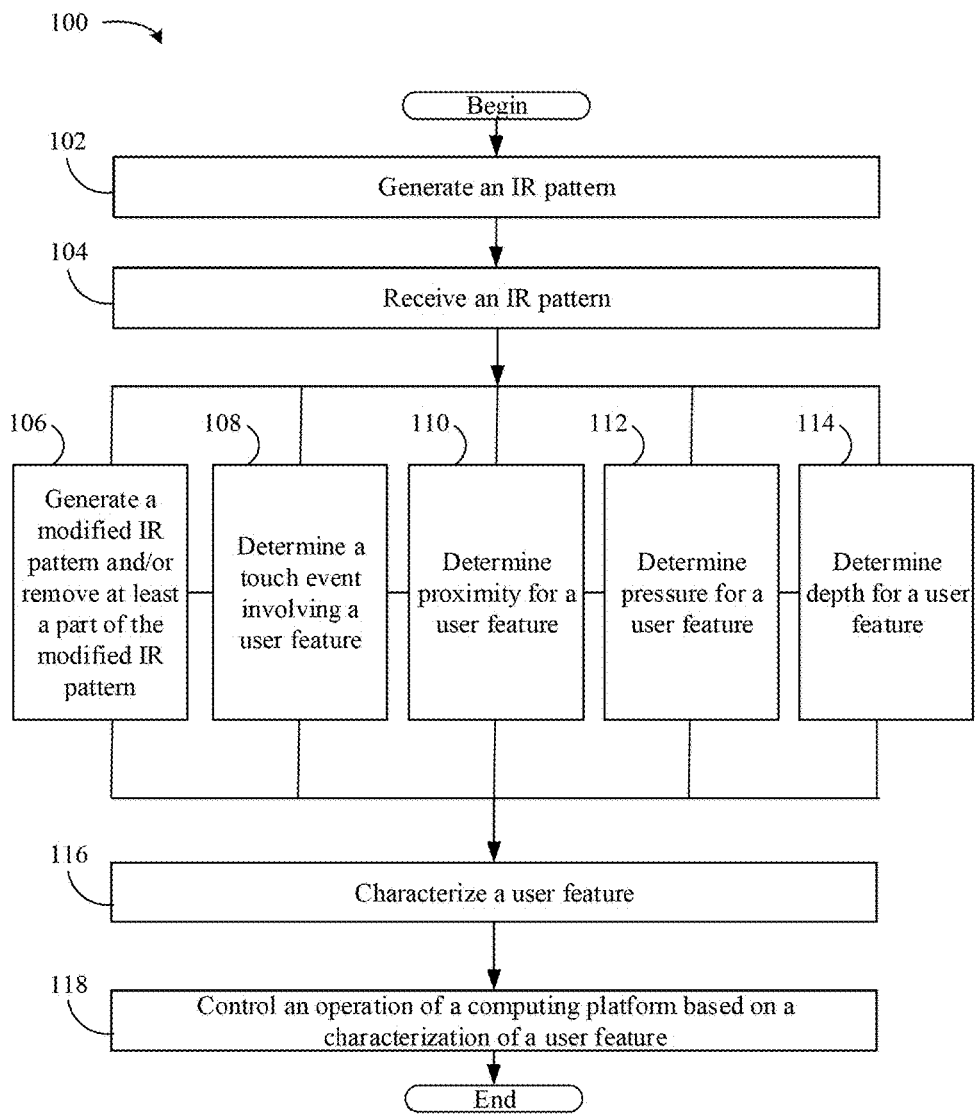
FIG. 5 is an illustration of an example of a method to characterize a user feature from IR radiation according to an embodiment.

Turning now to FIG. 5, a method 100 is shown to characterize a user feature from IR radiation according to an embodiment. The method 100 may be implemented as a module or related component in a set of logic instructions stored in a non-transitory machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality hardware logic using circuit technology such as, for example, application specific integrated circuit (ASIC), complementary metal oxide semiconductor (CMOS) or transistor-transistor logic (TTL) technology, or any combination thereof. For example, computer program code to carry out operations shown in the method 100 may be written in any combination of one or more programming languages, including an object oriented programming language such as JAVA, SMALLTALK, C++ or the like and conventional procedural programming languages, such as the "C" programming language or similar programming languages.

Illustrated processing block 102 provides for generating an IR pattern. Block 102 may, for example, emit IR light through a camera lens to form an IR pattern (e.g., dotted IR pattern) and IR light reflected by skin of a user feature may provide an IR pattern (e.g., feature IR pattern) that has different optical properties relative to an IR pattern provided by IR light reflected by objects (e.g., object IR pattern) in a scene.

Illustrated processing block 104 provides for receiving an IR pattern. Block 104 may, for example, obtain an IR image having IR patterns corresponding to the user feature and the object in the scene. In one example, IR patterns may include grayscale pixel values between a minimum value (e.g., 8-bit value, black pixel=0) and a maximum value (e.g., 8-bit value, white pixel=255).

Illustrated processing block 106 provides for generating a modified IR pattern and/or removing at least a part of the modified IR pattern. Block 106 may, for example, apply a convolution kernel such as a sharpening kernel (e.g., n×m kernel) to generate a sharpened IR pattern as the modified IR pattern by modification of a pixel value in an object IR pattern to a minimum value (e.g., 8-bit value=0) or a maximum value (e.g., 8-bit value=255). In addition, block 106 may apply an erosion kernel (e.g., n×m kernel) to generate an erosion IR pattern from the sharpened IR pattern by removal of at least a part of the sharpened IR pattern from the feature IR pattern based on a neighborhood of pixel values including the minimum value and the maximum value until a predetermined resolution threshold is met for the user feature. Block 106 may implement a plurality of iterations of erosion until the predetermined resolution is met.

Illustrated processing block 108 provides for determining a touch event involving a user feature. Block 108 may, for example, determine that the user feature is in contact with the object when a shadow concentration between the feature IR pattern and the object IR pattern is below a predetermined threshold. In one example, no black pixels in an area adjacent to the user feature IR pattern and the object IR pattern where a shadow is expected indicates that the user feature is touching the object.

Illustrated processing block 110 provides for determining proximity for a user feature. Block 110 may, for example, determine that a specific number of black pixels from the shadow concentration indicate a specific distance of the user feature to the object. In one example, a number of black pixels in an area adjacent to the feature IR pattern and the object IR pattern where a shadow is expected may indicate that the user feature is a particular distance away from the object.

Illustrated processing block 112 provides for determining pressure for a user feature. Block 112 may, for example, determine that a calculated IR pressure value is different than a reference IR pressure value (e.g., a resting IR pressure value). Similarly, block 112 may utilize a red-blue-green (RGB) pressure value to detect a change from a reference RGB pressure value. In this regard, detection of any change from reference pressure values may be all that is needed to determine a press event.

Block 112 may also determine pressure to detect a press event from grayscale pixel values and/or RGB values independent of detecting whether a change has occurred. For example, RGB values corresponding to white color around a fingertip and/or relatively lighter grayscale IR pixel values in a pixel area for the fingertip may indicate blood has moved away from the fingertip in a press event. Block 112 may also determine a magnitude of pressure (e.g., how hard a user is pressing with the user feature) based on pressure values and/or reference pressure values. Pressure values may be provided to a user interface to render a pressure bar that provides visualization of pressure when, for example, the user feature is in contact with the object in a press state.

Illustrated processing block 114 provides for determining a depth of the user feature. Block 114 may, for example, determine depth based on a comparison between a portion of pixels from the feature IR pattern in a first stereo IR image and a portion of pixels from a different feature IR pattern corresponding to IR radiation reflected by the skin of the same feature in a second stereo IR image. Block 114 may, for example, use a real-time calculation based on an offset value to calculate depth of the user feature in 3D space. The offset value may indicate a number of pixels that user features offset in distance, that pixel areas offset in distance, and so on. In one example, the offset value indicates that the user feature is a particular distance away from an image device.

Illustrated processing block 116 provides for characterizing a user feature. Block 116 may, for example, characterize the user feature based on the feature IR pattern. In one example, block 116 may identify the user feature based on the feature IR pattern. In addition, block 116 may identify a gesture involving the user feature based on the feature IR pattern. Block 116 may also identify a state involving the user feature based on the feature IR pattern.

Illustrated processing block 118 provides for controlling an operation of a computing platform based on a characterization of a user feature. Block 118 may, for example, control selection of a projected element on a surface based on a determination of proximity for the user feature, a touch event involving the user feature, pressure involving the user feature, and/or depth for the user feature.

While independent blocks and/or a particular order has been shown for illustration purposes, it should be understood that one or more of the blocks of the method 100 may be combined, omitted, bypassed, re-arranged, and/or flow in any order. In addition, any or all blocks of the method 100 may include further techniques, including techniques to recognize a shadow associated with the user feature, to recognize depth of the user feature in 3D space, and so on. Moreover, any or all blocks of the method 100 may be automatically implemented (e.g., without human intervention, etc.). For example, block 106 may automatically generate a modified IR pattern.

Figure 6:
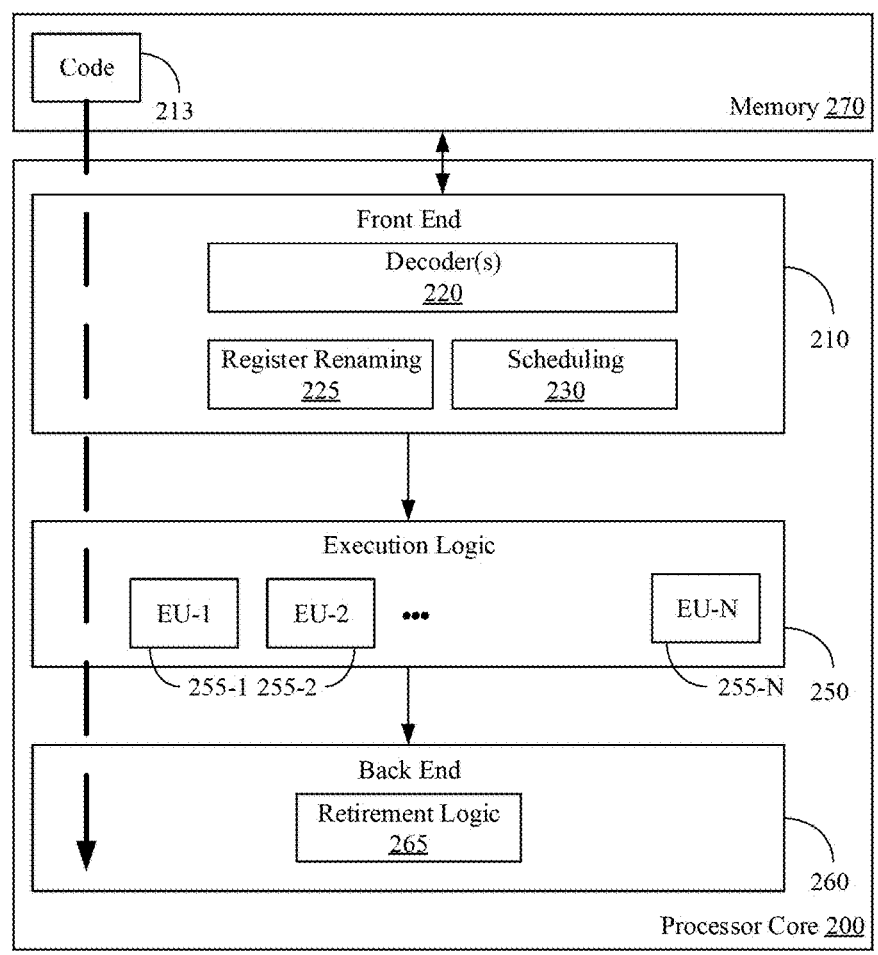
FIG. 6 is a block diagram of an example of a processor according to an embodiment.

FIG. 6 shows a processor core 200 according to one embodiment. The processor core 200 may be the core for any type of processor, such as a micro-processor, an embedded processor, a digital signal processor (DSP), a network processor, or other device to execute code. Although only one processor core 200 is illustrated in FIG. 6, a processing element may alternatively include more than one of the processor core 200 illustrated in FIG. 6. The processor core 200 may be a single-threaded core or, for at least one embodiment, the processor core 200 may be multithreaded in that it may include more than one hardware thread context (or "logical processor") per core.

FIG. 6 also illustrates a memory 270 coupled to the processor core 200. The memory 270 may be any of a wide variety of memories (including various layers of memory hierarchy) as are known or otherwise available to those of skill in the art. The memory 270 may include one or more code 213 instruction(s) to be executed by the processor core 200, wherein the code 213 may implement the image device 12 (FIG. 1), the apparatus 20 (FIG. 1), images including the IR image 65 (FIGS. 2A-2B), the IR images 72, 82, (FIGS. 3A-3B), the IR image 92 (FIG. 4), and/or the method 100 (FIG. 5), already discussed. The processor core 200 follows a program sequence of instructions indicated by the code 213. Each instruction may enter a front end portion 210 and be processed by one or more decoders 220. The decoder 220 may generate as its output a micro operation such as a fixed width micro operation in a predefined format, or may generate other instructions, microinstructions, or control signals which reflect the original code instruction. The illustrated front end portion 210 also includes register renaming logic 225 and scheduling logic 230, which generally allocate resources and queue the operation corresponding to the convert instruction for execution.

The processor core 200 is shown including execution logic 250 having a set of execution units 255-1 through 255-N. Some embodiments may include a number of execution units dedicated to specific functions or sets of functions. Other embodiments may include only one execution unit or one execution unit that can perform a particular function. The illustrated execution logic 250 performs the operations specified by code instructions.

After completion of execution of the operations specified by the code instructions, back end logic 260 retires the instructions of the code 213. In one embodiment, the processor core 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 6, a processing element may include other elements on chip with the processor core 200. For example, a processing element may include memory control logic along with the processor core 200. The processing element may include I/O control logic and/or may include I/O control logic integrated with memory control logic. The processing element may also include one or more caches.

ADDITIONAL NOTES AND EXAMPLES

Example 1 may include a system to characterize a user feature comprising an image device including an emitter to emit uniform infrared (IR) radiation that is to be converted to non-uniform IR radiation having an IR pattern and a capturer to capture reflected non-uniform IR radiation, a pattern receiver to receive a feature IR pattern corresponding to non-uniform IR radiation reflected by skin of a user feature and an object IR pattern corresponding to non-uniform IR radiation reflected by an object, a filter to generate a modified IR pattern from the object IR pattern and to remove at least a part of the modified IR pattern from feature IR pattern, and a feature characterizer to characterize the user feature based on the feature IR pattern.

Example 2 may include the system of Example 1, further including one or more of a touch determiner to determine a touch event involving the user feature based on a shadow concentration between the feature IR pattern and the object IR pattern, a proximity determiner to determine proximity of the user feature to the object based on the shadow concentration, a pressure determiner to determine pressure corresponding to a press event involving the user feature based on a pattern change associated with the feature IR pattern, or a depth determiner to determine a depth of the user feature based on a comparison between a portion of pixels from the feature IR pattern in a first stereo IR image and a portion of pixels from a different feature IR pattern corresponding to non-uniform IR radiation reflected by the skin of the user feature in a second stereo IR image.

Example 3 may include the system of any one of Examples 1 to 2, wherein the image filter is to include one or more of a convolver to generate a sharpened IR pattern as the modified IR pattern by modification of a pixel value in the object IR pattern to a minimum value or a maximum value based on a pre-defined spatial rule, or an eroder to generate an erosion IR pattern from the sharpened IR pattern by removal of at least a part of the sharpened IR pattern from the feature IR pattern based on a neighborhood of pixel values including the minimum value and the maximum value until a predetermined resolution threshold is met for the user feature.

Example 4 may include an apparatus to characterize a user feature comprising a pattern receiver to receive a feature infrared (IR) pattern corresponding to non-uniform IR radiation reflected by skin of a user feature and an object IR pattern corresponding to non-uniform IR radiation reflected by an object, a filter to generate a modified IR pattern from the object IR pattern and to remove at least a part of the modified IR pattern from feature IR pattern, and a feature characterizer to characterize the user feature based on the feature IR pattern.

Example 5 may include the apparatus of Example 4, wherein the feature characterizer is to include a feature identifier to identify the user feature based on the feature IR pattern, a gesture identifier to identify a gesture involving the user feature based on the feature IR pattern, and a state identifier to identify a state involving the user feature based on the feature IR pattern.

Example 6 may include the apparatus of any one of Examples 1 to 5, further including a controller to control an operation of a computing platform based on the characterization of the user feature.

Example 7 may include the apparatus of any one of Examples 1 to 6, further including a touch determiner to determine a touch event involving the user feature based on a shadow concentration between the feature IR pattern and the object IR pattern, and a proximity determiner to determine proximity of the user feature to the object based on the shadow concentration.

Example 8 may include the apparatus of any one of Examples 1 to 7, further including a pressure determiner to determine pressure corresponding to a press event involving the user feature based on a pattern change associated with the feature IR pattern and a color change associated with user feature.

Example 9 may include the apparatus of any one of Examples 1 to 8, further including a depth determiner to determine a depth of the user feature based on a comparison between a portion of pixels from the feature IR pattern in a first stereo IR image and a portion of pixels from a different feature IR pattern corresponding to non-uniform IR radiation reflected by the skin of the user feature in a second stereo IR image.

Example 10 may include the apparatus of any one of Examples 1 to 9, wherein the image filter is to include a convolver to generate a sharpened IR pattern as the modified IR pattern by modification of a pixel value in the object IR pattern to a minimum value or a maximum value based on a pre-defined spatial rule, and an eroder to generate an erosion IR pattern from the sharpened IR pattern by removal of at least a part of the sharpened IR pattern from the feature IR pattern based on a neighborhood of pixel values including the minimum value and the maximum value until a predetermined resolution threshold is met for the user feature.

Example 11 may include at least one computer readable storage medium comprising a set of instructions, which when executed by a processor, cause the processor to automatically receive a feature infrared (IR) pattern corresponding to non-uniform IR radiation reflected by skin of a user feature and an object IR pattern corresponding to non-uniform IR radiation reflected by an object, automatically generate a modified IR pattern from the object IR pattern and to remove at least a part of the modified IR pattern from feature IR pattern, and automatically characterize the user feature based on the feature IR pattern.

Example 12 may include the at least one computer readable storage medium of Example 11, wherein the instructions, when executed, cause the processor to identify the user feature based on the feature IR pattern, identify a gesture involving the user feature based on the feature IR pattern, and identify a state involving the user feature based on the feature IR pattern.

Example 13 may include the at least one computer readable storage medium of any one of Examples 11 to 12, wherein the instructions, when executed, cause the processor to control an operation of a computing platform based on the characterization of the user feature.

Example 14 may include the at least one computer readable storage medium of any one of Examples 11 to 13, wherein the instructions, when executed, cause the processor to determine a touch event involving the user feature based on a shadow concentration between the feature IR pattern and the object IR pattern, and determine proximity of the user feature to the object based on the shadow concentration.

Example 15 may include the at least one computer readable storage medium of any one of Examples 11 to 14, wherein the instructions, when executed, cause the processor to determine pressure corresponding to a press event involving the user feature based on a pattern change associated with the feature IR pattern and a color change associated with user feature.

Example 16 may include the at least one computer readable storage medium of any one of Examples 11 to 15, wherein the instructions, when executed, cause the processor to determine a depth of the user feature based on a comparison between a portion of pixels from the feature IR pattern in a first stereo IR image and a portion of pixels from a different feature IR pattern corresponding to non-uniform IR radiation reflected by the skin of the user feature in a second stereo IR image.

Example 17 may include the at least one computer readable storage medium of any one of Examples 11 to 16, wherein the instructions, when executed, cause the processor to generate a sharpened IR pattern as the modified IR pattern by modification of a pixel value in the object IR pattern to a minimum value or a maximum value based on a pre-defined spatial rule, and generate an erosion IR pattern from the sharpened IR pattern by removal of at least a part of the sharpened IR pattern from the feature IR pattern based on a neighborhood of pixel values including the minimum value and the maximum value until a predetermined resolution threshold is met for the user feature.

Example 18 may include a method to characterize a user feature comprising automatically receiving a feature infrared (IR) pattern corresponding to non-uniform IR radiation reflected by skin of a user feature and an object IR pattern corresponding to non-uniform IR radiation reflected by an object, automatically generating a modified IR pattern from the object IR pattern and removing at least a part of the modified IR pattern from feature IR pattern, and automatically characterizing the user feature based on the feature IR pattern.

Example 19 may include the method of Example 18, further including identifying the user feature based on the feature IR pattern, identifying a gesture involving the user feature based on the feature IR pattern, and identifying a state involving the user feature based on the feature IR pattern.

Example 20 may include the method of any one of Examples 18 to 19, further including controlling an operation of a computing platform based on the characterization of the user feature.

Example 21 may include the method of any one of Examples 18 to 20, further including determining a touch event involving the user feature based on a shadow concentration between the feature IR pattern and the object IR pattern, and determining proximity of the user feature to the object based on the shadow concentration.

Example 22 may include the method of any one of Examples 18 to 21, further including determining pressure corresponding to a press event involving the user feature based on a pattern change associated with the feature IR pattern and a color change associated with user feature.

Example 23 may include the method of any one of Examples 18 to 22, further including determining a depth of the user feature based on a comparison between a portion of pixels from the feature IR pattern in a first stereo IR image and a portion of pixels from a different feature IR pattern corresponding to non-uniform IR radiation reflected by the skin of the user feature in a second stereo IR image.

Example 24 may include the method of any one of Examples 18 to 23, further including generating a sharpened IR pattern as the modified IR pattern by modification of a pixel value in the object IR pattern to a minimum value or a maximum value based on a pre-defined spatial rule, and generating an erosion IR pattern from the sharpened IR pattern by removal of at least a part of the sharpened IR pattern from the feature IR pattern based on a neighborhood of pixel values including the minimum value and the maximum value until a predetermined resolution threshold is met for the user feature.

Example 25 may include an apparatus to characterize a user feature comprising means for performing the method of any one of Examples 18 to 24.

Thus, techniques described herein provide for characterizing a feature. In one example, on-demand hand/finger interactions including touching, tracking, approaching, and/or a pressing input event may be determined without physically contacting a computing device. For example, a single depth camera and logic may achieve tracking, detection of touching, determination of z-proximity, and/or detection of pressing.

Embodiments may include, for example, quantification of hand/finger positions (e.g., x,y,z coordinates) and pressure (e.g., when touching a planar surface) with a single optical device. In one example, raw stereo images may be utilized for extracting skin features and determining hand/finger proximity related to a nearby plane for touch events, without requiring point cloud techniques. Embodiments may, for example, detect hand-touching events by calculating shadow concentration of raw IR images from left and/or right imagers. In addition, the shadow concentration may provide surface proximity information for hand/finger position tracking (e.g., less shadow indicates closer proximity). Moreover, detection of IR and color concentrations of finger pressing and idle states may be utilized to quantify touch pressure for a touch event exclusively from characterizing optical quantities (e.g., values).

In particular, embodiments may provide user feature detection with a singe IR image. In one example, a convolution kernel may be applied to identify skin and non-skin areas by characterizing IR light diffusion in an IR image. Reflection of an IR pattern on a non-skin surface may appear sharper than reflection of an IR pattern on skin since IR light may become more scattered on the surface of skin (e.g., pattern appears softer and/or more blurry). The convolution kernel may be used to extract hand contour by making IR patterns for non-skin sparser in grayscale. Erosion may also be used to filter out relatively sparse pixels via one or more iterations. Filtering may be implemented, for example, as soon as an IR image is available and may provide hand contour for further computations (e.g., feature identification, control data, etc.) without using skin color.

Embodiments may also provide proximity of a hand to a planar surface from a shadow difference from left and/or right stereo images. Proximity may relate to distance of a user feature to an object and may indicate a touch event. In addition, changes in RGB values and/or IR values during a period of time may be utilized to detect a touch event. A finger press event may be visually represented via a pressure bar. In addition, embodiments may provide relatively high quality spatial coordinates for skin feature interactions using a single depth camera. Thus, embodiments may reduce the relative amount of input hardware for tracking, etc., into a single optical-based depth camera.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/ or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the computing system within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" or "at least one of" may mean any combination of the listed terms. For example, the phrases "one or more of A, B or C" may mean A; B; C; A and B; A and C; B and C; or A, B and C. In addition, a list of items joined by the term "and so on" or "etc." may mean any combination of the listed terms as well any combination with other terms.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A system comprising:
    an image device including,
        an emitter to emit uniform infrared (IR) radiation that is to be converted to non-uniform IR radiation having an IR pattern, and
        a capturer to capture reflected non-uniform IR radiation,
    a pattern receiver to receive a feature IR pattern corresponding to non-uniform IR radiation reflected by skin of a user feature and an object IR pattern corresponding to non-uniform IR radiation reflected by an object,
    a filter to generate a modified IR pattern from the object IR pattern and to remove at least a part of the modified IR pattern from feature IR pattern, wherein the filter is to include,
        a convolver to generate a sharpened IR pattern as the modified IR pattern by modification of a pixel value in the object IR pattern to a minimum value or a maximum value based on a pre-defined spatial rule, and
        an eroder to generate an erosion IR pattern from the sharpened IR pattern by removal of at least a part of the sharpened IR pattern from the feature IR pattern based on a neighborhood of pixel values including the minimum value and the maximum value until a predetermined resolution threshold is met for the user feature, and
    a feature characterizer to characterize the user feature based on the feature IR pattern.

2. The system of claim 1, further including one or more of,
    a touch determiner to determine a touch event involving the user feature based on a shadow concentration between the feature IR pattern and the object IR pattern,
    a proximity determiner to determine proximity of the user feature to the object based on the shadow concentration,
    a pressure determiner to determine pressure corresponding to a press event involving the user feature based on a pattern change associated with the feature IR pattern, or
    a depth determiner to determine a depth of the user feature based on a comparison between a portion of pixels from the feature IR pattern in a first stereo IR image and a portion of pixels from a different feature IR pattern corresponding to non-uniform IR radiation reflected by the skin of the user feature in a second stereo IR image.

3. An apparatus comprising:
a pattern receiver to receive a feature infrared (IR) pattern corresponding to non-uniform IR radiation reflected by skin of a user feature and an object IR pattern corresponding to non-uniform IR radiation reflected by an object,
a filter to generate a modified IR pattern from the object IR pattern and to remove at least a part of the modified IR pattern from feature IR pattern, wherein the filter is to include,
a convolver to generate a sharpened IR pattern as the modified IR pattern by modification of a pixel value in the object IR pattern to a minimum value or a maximum value based on a pre-defined spatial rule, and
an eroder to generate an erosion IR pattern from the sharpened IR pattern by removal of at least a part of the sharpened IR pattern from the feature IR pattern based on a neighborhood of pixel values including the minimum value and the maximum value until a predetermined resolution threshold is met for the user feature, and
a feature characterizer to characterize the user feature based on the feature IR pattern.

4. The apparatus of claim 3, wherein the feature characterizer is to include,
a feature identifier to identify the user feature based on the feature IR pattern,
a gesture identifier to identify a gesture involving the user feature based on the feature IR pattern, and
a state identifier to identify a state involving the user feature based on the feature IR pattern.

5. The apparatus of claim 3, further including a controller to control an operation of a computing platform based on the characterization of the user feature.

6. The apparatus of claim 3, further including,
a touch determiner to determine a touch event involving the user feature based on a shadow concentration between the feature IR pattern and the object IR pattern, and
a proximity determiner to determine proximity of the user feature to the object based on the shadow concentration.

7. The apparatus of claim 3, further including a pressure determiner to determine pressure corresponding to a press event involving the user feature based on a pattern change associated with the feature IR pattern and a color change associated with user feature.

8. The apparatus of claim 3, further including a depth determiner to determine a depth of the user feature based on a comparison between a portion of pixels from the feature IR pattern in a first stereo IR image and a portion of pixels from a different feature IR pattern corresponding to non-uniform IR radiation reflected by the skin of the user feature in a second stereo IR image.

9. At least one non-transitory computer readable storage medium comprising a set of instructions, which when executed by a processor, cause the processor to:
automatically receive a feature infrared (IR) pattern corresponding to non-uniform IR radiation reflected by skin of a user feature and an object IR pattern corresponding to non-uniform IR radiation reflected by an object;
automatically generate a modified IR pattern from the object IR pattern and to remove at least a part of the modified IR pattern from feature IR pattern including to:
generate a sharpened IR pattern as the modified IR pattern by modification of a pixel value in the object IR pattern to a minimum value or a maximum value based on a pre-defined spatial rule; and
generate an erosion IR pattern from the sharpened IR pattern by removal of at least a part of the sharpened IR pattern from the feature IR pattern based on a neighborhood of pixel values including the minimum value and the maximum value until a predetermined resolution threshold is met for the user feature; and
automatically characterize the user feature based on the feature IR pattern.

10. The at least one non-transitory computer readable storage medium of claim 9, wherein the instructions, when executed, cause the processor to:
identify the user feature based on the feature IR pattern;
identify a gesture involving the user feature based on the feature IR pattern; and
identify a state involving the user feature based on the feature IR pattern.

11. The at least one non-transitory computer readable storage medium of claim 9, wherein the instructions, when executed, cause the processor to control an operation of a computing platform based on the characterization of the user feature.

12. The at least one non-transitory computer readable storage medium of claim 9, wherein the instructions, when executed, cause the processor to:
determine a touch event involving the user feature based on a shadow concentration between the feature IR pattern and the object IR pattern; and
determine proximity of the user feature to the object based on the shadow concentration.

13. The at least one non-transitory computer readable storage medium of claim 9, wherein the instructions, when executed, cause the processor to determine pressure corresponding to a press event involving the user feature based on a pattern change associated with the feature IR pattern and a color change associated with user feature.

14. The at least one non-transitory computer readable storage medium of claim 9, wherein the instructions, when executed, cause the processor to determine a depth of the user feature based on a comparison between a portion of pixels from the feature IR pattern in a first stereo IR image and a portion of pixels from a different feature IR pattern corresponding to non-uniform IR radiation reflected by the skin of the user feature in a second stereo IR image.

15. A method comprising:
automatically receiving a feature infrared (IR) pattern corresponding to non-uniform IR radiation reflected by skin of a user feature and an object IR pattern corresponding to non-uniform IR radiation reflected by an object;
automatically generating a modified IR pattern from the object IR pattern and removing at least a part of the modified IR pattern from feature IR pattern including:
generating a sharpened IR pattern as the modified IR pattern by modification of a pixel value in the object IR pattern to a minimum value or a maximum value based on a pre-defined spatial rule; and
generating an erosion IR pattern from the sharpened IR pattern by removal of at least a part of the sharpened IR pattern from the feature IR pattern based on a neighborhood of pixel values including the minimum value and the maximum value until a predetermined resolution threshold is met for the user feature; and automatically characterizing the user feature based on the feature IR pattern.

16. The method of claim 15, further including:

identifying the user feature based on the feature IR pattern;

identifying a gesture involving the user feature based on the feature IR pattern; and identifying a state involving the user feature based on the feature IR pattern.

17. The method of claim 15, further including controlling an operation of a computing platform based on the characterization of the user feature.

18. The method of claim 15, further including:

determining a touch event involving the user feature based on a shadow concentration between the feature IR pattern and the object IR pattern; and determining proximity of the user feature to the object based on the shadow concentration.

19. The method of claim 15, further including determining pressure corresponding to a press event involving the user feature based on a pattern change associated with the feature IR pattern and a color change associated with user feature.

20. The method of claim 15, further including determining a depth of the user feature based on a comparison between a portion of pixels from the feature IR pattern in a first stereo IR image and a portion of pixels from a different feature IR pattern corresponding to non-uniform IR radiation reflected by the skin of the user feature in a second stereo IR image.

* * * * *